US005518526A

United States Patent [19]
Baksh et al.

[11] Patent Number: 5,518,526
[45] Date of Patent: May 21, 1996

[54] PRESSURE SWING ADSORPTION PROCESS

[75] Inventors: Mohamed S. A. Baksh, Amherst; Vincent J. Kibler, West Falls; Herbert R. Schaub, East Amherst, all of N.Y.

[73] Assignee: Praxair Technology, Inc., Danbury, Conn.

[21] Appl. No.: 319,692

[22] Filed: Oct. 7, 1994

[51] Int. Cl.⁶ .................................................. B01D 53/053
[52] U.S. Cl. ...................... 95/100; 95/101; 95/122; 95/130; 96/133; 96/144
[58] Field of Search ........................ 95/95, 98, 100–105, 95/118, 122, 130; 96/121, 133, 144

[56] References Cited

U.S. PATENT DOCUMENTS

| | | | |
|---|---|---|---|
| 2,944,627 | 7/1960 | Skarstrom | 183/4.7 |
| 3,142,547 | 7/1964 | Marsh et al. | 95/100 |
| 3,430,418 | 8/1969 | Wagner | 55/25 |
| 3,636,679 | 1/1972 | Batta | 55/26 |
| 3,680,288 | 8/1972 | Eluard | 95/98 |
| 3,738,087 | 6/1973 | McCombs | 55/58 |
| 3,788,036 | 1/1974 | Lee et al. | 55/25 |
| 4,144,037 | 3/1979 | Armond et al. | 95/95 |
| 4,194,891 | 3/1980 | Earls et al. | 95/98 |
| 4,194,892 | 3/1980 | Jones et al. | 95/95 |
| 4,340,398 | 7/1982 | Doshi et al. | 55/25 |
| 4,512,779 | 4/1985 | Haÿ | 95/100 |
| 4,650,501 | 3/1987 | Hiscock et al. | 95/100 |
| 4,781,735 | 11/1988 | Tagawa et al. | 55/26 |
| 5,122,164 | 6/1992 | Hirooka et al. | 55/26 |
| 5,223,004 | 6/1993 | Eteve et al. | 55/26 |
| 5,296,017 | 3/1994 | Kono et al. | 96/133 X |
| 5,328,503 | 7/1994 | Kumar et al. | 95/101 |
| 5,330,561 | 7/1994 | Kumar et al. | 95/105 X |
| 5,354,346 | 10/1994 | Kumar | 95/130 X |
| 5,370,728 | 12/1994 | LaSala et al. | 95/101 |

OTHER PUBLICATIONS

"The Backfill Cycle of the Pressure Swing Adsorption Process" Liow and Kenney, AIChE Journal, Jan., 1990, vol. 36, No. 1, pp. 53–65.

"Combined Cocurrent–Countercurrent Blowdown Cycle in Pressure Swing Adsorption", Suh and Wankat, AIChE Journal, Mar., 1989, vol. 35, No. 3, pp. 523–526.

*Primary Examiner*—Robert Spitzer
*Attorney, Agent, or Firm*—Alvin H. Fritschler

[57] ABSTRACT

A pressure swing adsorption process employs a simultaneous equalization and evacuation step followed by simultaneous feed and product gas repressurization steps, resulting in faster processing, and a reduction in power requirements, in the recovery of oxygen and argon from feed air.

20 Claims, 7 Drawing Sheets

ET = EQUALIZATION TANK

PRESSURE SWING ADSORPTION PROCESS

BACKGROUND OF THE INVENTION

1. Field of the Invention

The present invention relates to the separation of a first gas, such as oxygen gas, from a mixed gas such as air containing oxygen and other selectably-adsorbable gaseous components.

The object is to provide a more efficient pressure swing adsorption (PSA) process for the production of a concentrated gas, such as oxygen, from a gas mixture, such as air, which process utilizes the adsorbent in a more efficient manner (lower bed size factor), and requires less energy than other processes using prior art technology to produce high purity gas from gas mixtures.

The PSA process is based upon the differential adsorption of selectively adsorbable gases and non-preferentially adsorbable gases, from mixtures thereof, on conventional adsorption bed materials such as zeolites. In the known process, the adsorption bed unit, or the first such bed unit of a two or three bed unit system, each of which may contain a lower bed stratum for removing water and carbon dioxide and an upper or downstream bed stratum for adsorbing the selectively adsorbable gas from supply of a gas mixture passed therethrough, is pressurized to a high pressure value to cause the selective removal of water and carbon dioxide and the selective adsorption of the one gas, while the pressurized non-selectively adsorbable gas is unaffected and passes through to a reception unit, which may be the second bed unit of the system. In such case the second bed unit becomes pressurized by the non-adsorbed gas, preparatory to coming on stream in the next cycle. The next bed unit, i.e. a third bed unit or the first bed unit of a two bed system, is being cleaned by back-flow or countercurrent evacuation by passing a supply of medium pressure waste gas or void gas purged from an equalization tank or from the bed unit being depressurized after producing the non-adsorbed, concentrated gas. This cleans the bed unit for subsequent repressurization and concentrated gas production. After a timed period the second bed unit is brought into sequential use, the first bed unit is evacuated and the second bed unit is repressurized.

Although many modifications and variations of the basic PSA cycle have been studied and applied to commercial processes, such as for the production of oxygen from air, such systems generally are inefficient and uneconomical for high purity production of oxygen for large plants when compared to the alternative method using cryogenic distillation. Therefore, it is an object of this invention to provide a highly efficient PSA process for producing large volumes of high purity oxygen from air with a lower power requirement.

DISCUSSION OF THE PRIOR ART

The original PSA process was developed by Skarstrom, U.S. Pat. No. 2,944,627, and consists of a cycle including four basic steps: (1) Adsorption, (2) Depressurization, (3) Purge, and (4) Repressurization. Several variations of the Skarstrom cycle have evolved. One such system is described in Wagner U.S. Pat. No. 3,430,418, wherein at least four beds are required to produce product continuously. The extra cost and complexity of providing four beds rather than a lesser number generally makes the Wagner system economically unfeasible.

In U.S. Pat. No. 3,636,679, Batta described a system where compressed air and product oxygen (obtained from another bed going through the equalization falling step) are simultaneously introduced at opposite ends of the same adsorbent bed. Another process for achieving further savings in equipment cost by using a two bed system is described by McCombs in U.S. Pat. No. 3,738,087, wherein an increasing pressure adsorption step is employed with feed air introduced to a partially repressurized adsorbent bed. Following the work of McCombs, Eteve et al., U.S. Pat. No. 5,223,004 described a PSA process utilizing the following steps: (1) a countercurrent product pressurization starting from the low pressure level of the cycle to an intermediate pressure level, (2) a cocurrent feed pressurization from the intermediate pressure level up to the adsorption pressure without bleeding off, (3) a production step wherein air is admitted and oxygen is bled off cocurrently, (4) a step where oxygen is bled off by partial depressurization cocurrently, wherein the admission of air is discontinued, and (5) a desorption step by depressurization countercurrently down to the low pressure level of the cycle.

Many more variations of the original PSA cycle can be found in the literature. For example, U.S. Pat. No. 4,194,891, 4,194,892 and 5,122,164 describe PSA cycles using short cycle times, wherein smaller particle size adsorbents are used to reduce diffusive resistance; Doshi et al, U.S. Pat. No. 4,340,398, discloses a PSA process utilizing three or more beds, wherein void gas is transferred to a tank prior to bed regeneration, and later used for repressurization. In addition, a process modification to a two-bed PSA process incorporating tank equalization is disclosed in U.S. Pat. Nos. 3,788,036 and 3,142,547, where the conserved gas is used as the purge gas for another bed.

More recently, Tagawa et al., U.S. Pat. No. 4,781,735, discloses a PSA process using three adsorbent beds to produce oxygen, with enhanced oxygen recovery achieved by connecting the feed end of one bed to the feed end of another bed (bottom-bottom equalization), and for all or part of the equalization time, top-top bed equalization is carried out simultaneously with the bottom-bottom equalization. In addition, U.S. Pat. No. 5,328,503, Kumar et al, describes a PSA process that uses an initial depressurization step to provide a purge gas, followed by an optional bed-bed pressured equalization step. In accordance with this patent, at least two adsorbent beds are employed, and a combination of product and feed gas are used for repressurization of the adsorbent beds.

Suh and Wankat (AIChE J. vol. 35, p523, 1989) disclose the use of combined cocurrent-countercurrent depressurization steps in PSA processes. They disclose that for the production of oxygen from air, the addition of a cocurrent depressurization step is not helpful. Liow and Kenny (AIChE J. vol. 36, p53, 1990) disclose a "backfill cycle" for oxygen production from air via computer simulation. They disclose that a countercurrent (with respect to feed direction) product repressurization step is beneficial when included in the cycle for producing an enriched oxygen product.

SUMMARY OF THE INVENTION

The present invention relates to an improved PSA process for separating a first gas, such as oxygen gas, from gas mixtures containing said first gas and one or more other gases including gases which are more preferentially adsorbable. It involves novel steps of simultaneous equalization and evacuation followed by simultaneous feed and product gas repressurization of PSA beds. This results in an overall faster and more efficient cycle with 100% utilization of a vacuum or pressure reducing blower, and a reduction in power use of about 15%.

The heart of the invention involves overlapping of various steps of the PSA cycle to reduce total cycle time and thus improve productivity. The other important parameters include choice of operating conditions (high pressure, low pressure, pressure at the end of equalization falling step, and the amount of high purity product used in the product pressurization step), the times allocated for each step, the order in which each step of the cycle is executed, and the use of equalization falling gas to provide the gas required for refluxing and equalization rising. The unique step in the cycle is the step of simultaneously evacuating the bed undergoing the equalization rising step while the other bed is undergoing the equalization falling step. The time allocated for this step must be chosen, so that at the end of this step, the former bed has been purged and also partially pressurized. The next step in the cycle is simultaneous product and feed pressurization at opposite ends of said bed, followed by feed pressurization to the desired adsorption pressure. Other key features of the invention are as follows: (a) the product gas required in the step of simultaneous feed and product pressurization usually comes from the product tank, or from another bed in the production step; and (b) the cocurrent depressurization or pressure equalization falling gas either goes to the downstream end of another bed or to a second storage tank. In the latter case, no bed-bed communication is required, which adds further flexibility in controlling the PSA process.

DETAILED DESCRIPTION OF THE INVENTION

The novel process of the present invention incorporates a novel sequence of operating steps in the PSA cycle, wherein the unload times for rotary machines (e.g. compressors and vacuum pumps) are minimized, product recovery is enhanced, the bed size factor (BSF) is comparable or lower than with prior art PSA cycles, and the power consumption is 5–20% lower than prior known PSA cycles. The operating steps in the present PSA cycle are as follows:

(I) Simultaneous introduction of feed gas mixture (e.g. air) and gas product being concentrated (e.g. oxygen) at opposite ends of the bed for partial repressurization to an intermediate pressure level. In this step, the product gas usually comes from the product tank, or from another bed in the production step.

(IIa) Feed pressurization (cocurrent) from the intermediate pressure level to the adsorption pressure, in the first part of step 2.

(IIb) Adsorption and gross product production, the second part of step 2.

(IIb) Cocurrent depressurization wherein the gas is transferred directly or indirectly, i.e., through an equalization tank to another bed that is being pressurized and evacuated simultaneously. In the indirect mode, the cocurrent depressurization gas goes to a second storage tank. In this case, no bed-bed communication is required.

(IV) Evacuation or depressurization to waste (countercurrent), while the other bed is undergoing simultaneous feed and product pressurization for a two-bed PSA process.

(V) Further evacuation or depressurization to waste. This step is the same as the previous step for the first bed. However, the other bed step is undergoing adsorption and gross product production (see FIG. 1).

(VI) Simultaneous pressurization (countercurrent) and evacuation, wherein the reflux gas is supplied by another bed undergoing cocurrent depressurization (step 3) or from the second storage tank that was used to capture cocurrent depressurization gas.

Figure 1A:
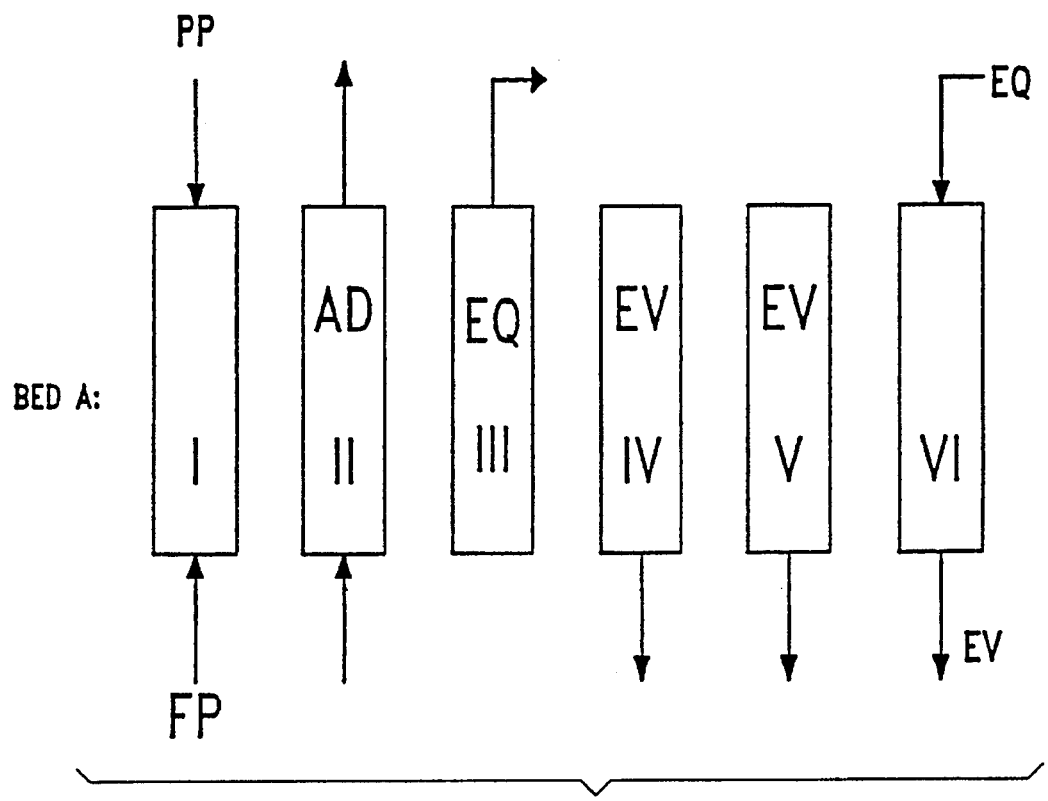
FIG. 1 illustrates the steps of a dual adsorption column cycle according to an embodiment of the present invention.
Figure 1B:
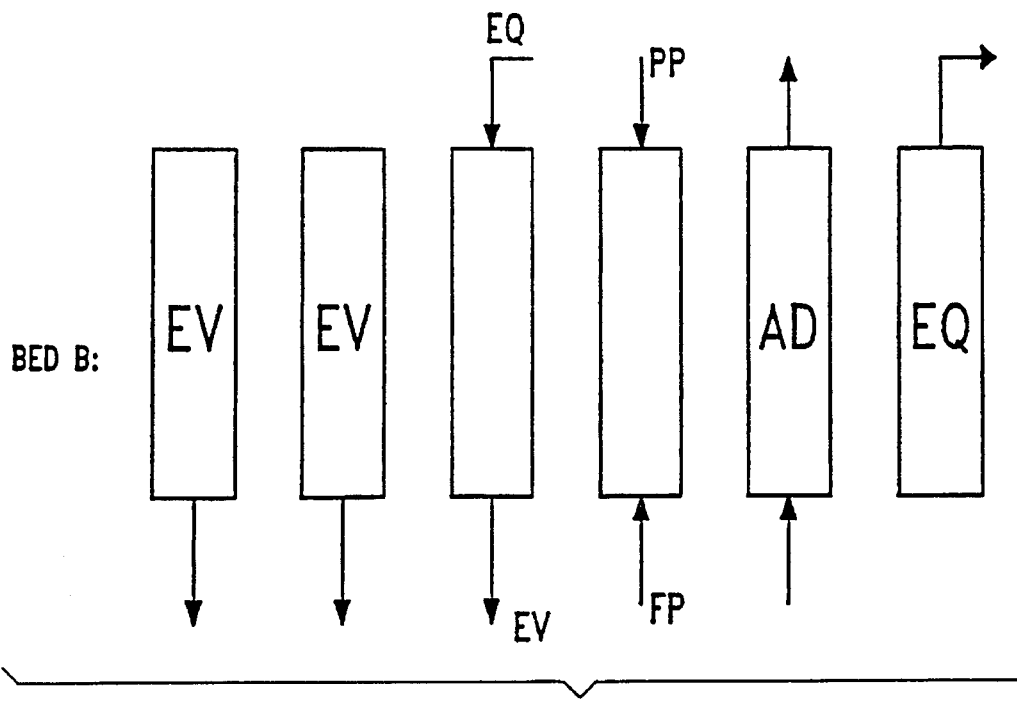

The above steps are shown schematically in FIG. 1 for a two-bed PSA process. Five points should be noted about this cycle: (a) a bed-bed equalization step is superimposed onto the purge step, wherein the bed undergoing equalization rising is also being evacuated simultaneously, (b) all of the reflux gas needed to purge the bed during regeneration is supplied by the void gas obtained from another bed during the cocurrent depressurization (equalization falling) step, (c) an overlap of product and feed pressurization steps, followed by feed pressurization alone to the adsorption pressure is used to achieve higher product flow rate, (d) a decrease in the total cycle time due to the superposition of individual steps, results in lower bed size factor (BSF), and (e) there is no unload time for the vacuum pump (see FIG. 1), i.e., the vacuum pump is utilized 100%.

In the novel cycle of the present invention, the equalization falling gas provides all of the gas needed by another bed that is undergoing equalization rising and evacuation simultaneously. Thus, this step overlaps the equalization step with the purge step, thereby modifying the conventional purge step and equalization step used in prior art PSA cycles. In addition, all of the reflux gas necessary to push the nitrogen wavefront out of the bed is provided by the other bed going through the equalization falling step. In this mode of operation, lower purity gas is used for the combined purging and equalization rising steps. The next step in the cycle (product pressurization, countercurrently) uses high purity product gas, usually from the product tank, to pressurize the column at the product end, while feed gas is simultaneously fed at the other end of the bed. The overlapping of individual steps results in faster PSA cycles with a high production rate of oxygen (lower BSF). In addition, since this cycle does not use a conventional purge step, none of the product gas is consumed for purging of the adsorbent bed. Also, during simultaneous evacuation and equalization rising, the bed pressure at the end of the step must be higher than the pressure in the previous step (evacuation step). Thus, both the flowrate of the incoming gas and the time allocated for this step must be selected carefully, so that at the end of this step, the bed has been purged and partially pressurized.

Thus, the invention consists of the overlapping of various steps in the PSA cycle to reduce total cycle time and thus improve productivity, the choice of operating conditions (high pressure, low pressure, pressure at the end of the equalization falling step, and the amount of high purity product used in step 1 of FIG. 1), the times allocated for each step, the order in which each step of the cycle is executed, and the use of equalization falling gas to provide the gas required for refluxing and equalization rising. The unique step in the cycle is step III (see FIG. 1), wherein the bed undergoing the equalization falling step is opened to another bed which is simultaneously being pressurized and evacuated. The time allocated for this step must be chosen so that at the end of this step, the second bed has been purged and partially pressurized. The next step in the cycle is simultaneous product and feed pressurization at opposite ends of the second bed, followed by feed pressurization to the adsorption pressure, step IIA, FIG. 3.

To practice the present invention for product $O_2$, for example, the following steps can be carried out:

(I) The intermediate pressure level, wherein both feed and product are introduced at opposite ends of the bed for partial pressurization, is selected between 0.5–1.2 atm. (1.0 atm.= 14.696 psi), and preferably about 0.9 atm., while the high pressure level is selected between 1.2–2.0 atm., and preferably about 1.42 atm. The low pressure level is selected between 0.30–0.45 atm., and preferably about 0.35 atm.

(II) The pressure during the production step can be rising from the intermediate pressure level of about 0.9 atm. (the pressure at the end of simultaneous product and feed step) to the adsorption pressure of about 1.42 atm. Alternatively, feed pressurization without bleed off occurs after simultaneous product and feed pressurization to reach the adsorption pressure, then a control valve opens to produce product. In this latter case, the pressure during the production step is at constant pressure.

(III) The feed input is terminated, and the column is depressurized cocurrently to recover the void gas and light component that co-adsorbed on the adsorbent. The pressure during this step decreases from the adsorption pressure of about 1.42 atm. down to about 1.10 atm. The gas collected in this step is henceforth referred to as "void gas". This gas can be stored in a second storage vessel (equalization tank) or can be fed directly to the product end of another bed undergoing equalization rising and evacuation steps simultaneously. In the latter case, at the end of this step, the bed has been purged and partially pressurized. Thus, the time allocated for this step is crucial, since some of the void gas is used as refluxing gas to move the nitrogen (heavy component) wavefront out of the bed via the feed end, while the remaining void gas is used for partial product pressurization. The pressure of the bed during this step rises from about 0.35 atm. to about 0.60 atm.

(IV) and (V) The desorption phase by depressurization countercurrently down to the low pressure level of about 0.35 atm.

(VI) First part of pressurization takes place while this bed is still undergoing evacuation. The gas required for this step is obtained from another bed undergoing the equalization falling step, or from a second tank that was used for storing void gas obtained from another bed during the equalization falling step. During this step, the pressure in the bed receiving void gas rises from about 0.35 atm. to about 0.60 atm.

Figure 2:
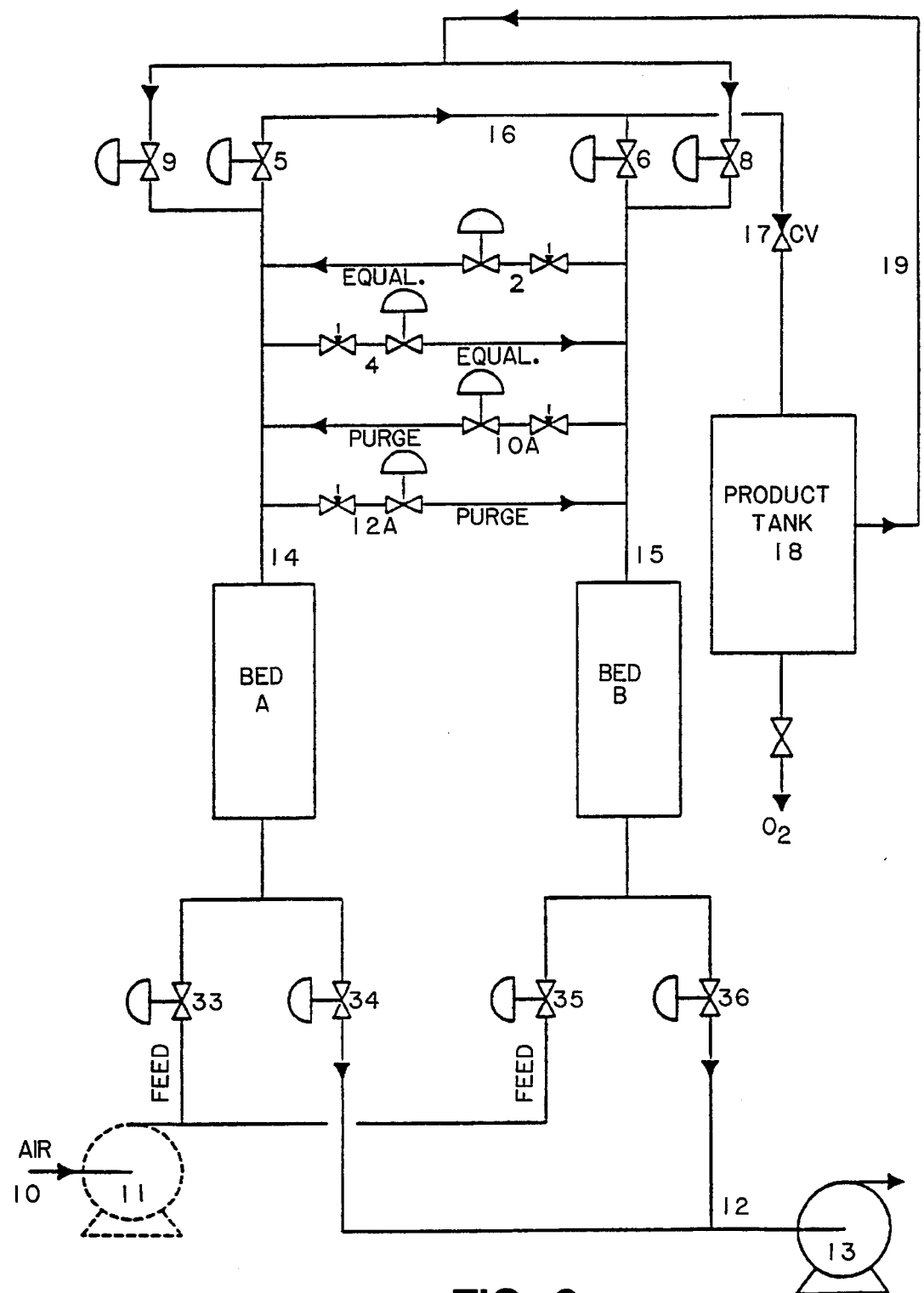
FIG. 2 is a flow sheet for the dual bed cycle of FIG. 1.
Figure 3:
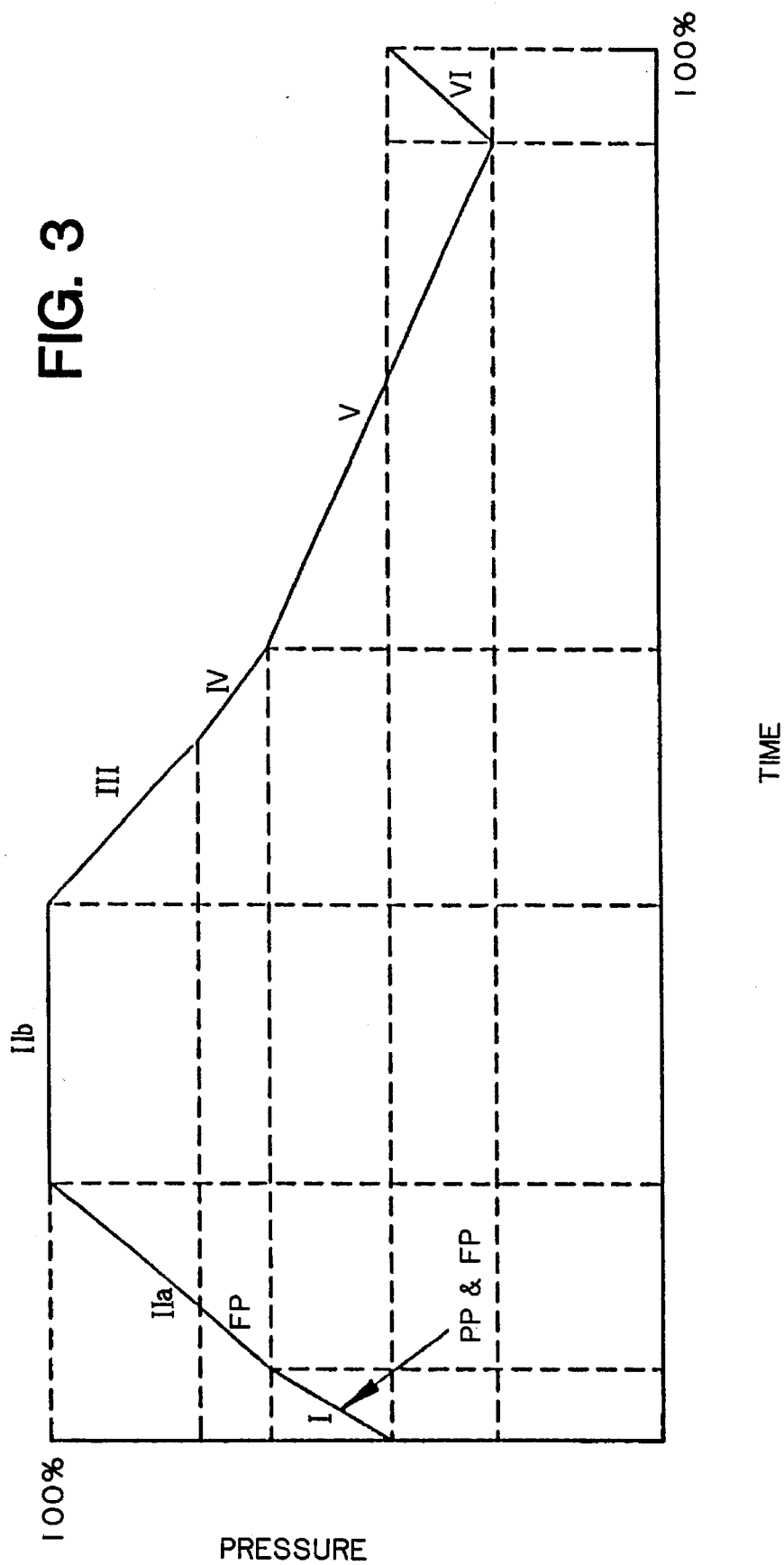
FIG. 3 is a time/pressure graph illustrating the evolution of pressure in a bed during the different steps of a complete cycle.

The basic features of the invention can be illustrated by describing the operation of a two-bed PSA process A and B shown in FIG. 1. However, it should be understood that one, or more than two beds, and other operating conditions (e.g. other pressure ranges) can be employed according to this invention. FIG. 2 is a schematic diagram of a two-bed PSA process consisting of the two adsorption beds A and B of FIG. 1, feed compressor(s) or blower(s) 11, vacuum pump(s) 13, product storage tank 18 and interconnected lines and valves. FIG. 3 shows the evolution of pressure during the execution of the various steps of the cycle, with the cycle starting after step 6 in FIG. 1. Referring to FIGS. 1, 2 and 3, the PSA process is disclosed for a complete cycle. The PSA process of FIG. 2 consists of two beds (A & B) filled with adsorbents, each having an inlet valve 33 or 35, and an outlet valve 34 or 36. The feed inlet valves 33 and 35 are connected to an air supply conduit 10 through a blower machine or compressor 11; whereas the exhaust outlet valves 34 and 36 are connected to a vacuum exhaust conduit 12 incorporating a vacuum pump 13. The bed outlet conduits 14 and 15 communicate with valves 5 and 6 to a production conduit 16 through a control valve 17 that connects to a product storage tank 18. Valves 10A and 12A allow the two beds to communicate if a purge gas step is included in the cycle. For example, valve 12A when opened, allows a portion of the product gas from bed A to supply a purge stream to bed B. Similarly, valve 10A when opened, allows a portion of the product gas from bed B to supply the purge gas to bed A. The outlet conduits 14 and 15 are connected to each other by valves 2 and 4. All the valves in the diagram are operated electronically via a computer system and program logic. Conduit 19 is connected to the product storage tank, and supplies product gas, via valves 8 and 9, for product pressurization of beds B and A, respectively.

Referring to FIGS. 1 and 2, the novel VPSA $O_2$ process for a two-bed system is now described to illustrate the opening and closing of the valves for each step of the cycle. All valves are closed except those indicated in each step. In this example the cycle time is about 60 seconds and the pressure ranges between a low of 0.35 atm. and a high of 2.0 atm.

Step I: Feed (air) through line 10, and product (oxygen), from tank 18, are introduced simultaneously at opposite ends of the bed. In the case of bed A, valves 33 and 9 are opened to allow feed and product gas to enter the bed, respectively. During this time, valve 36 is opened and the other bed B is undergoing evacuation.

Step II: In the feed pressurization and gross product make step, valves 33 and 5 are open and bed A undergoes further feed pressurization. Control valve 17 program logic dictates when this valve will be opened to allow product gas to enter the product tank 18 from bed A. For instance, if constant pressure is required during the make product steps, then control valve 17 only opens when bed A reaches a predetermined pressure level to allow product to enter the product tank 18. During the feed pressurization and make product step (step 2) for bed A, bed B is undergoing evacuation via valve 36.

Step III: Cocurrent depressurization. In one version of this invention, valve 33 is closed, and valve 4 is opened to recover the void gas from bed A and direct it to bed B to partially pressurize bed B (equalization rising for bed B), and as reflux gas to push the nitrogen wavefront in bed B towards the feed end thereof. During this time valve 36 is still opened, thus bed B undergoes equalization rising and evacuation simultaneously. Another version of this invention collects the equalization falling void gas into a separate storage tank for supply to bed B. In this latter case, no bed-bed communication is necessary.

Step IV: Valve 34 is now opened to evacuate bed A countercurrently, and valves 35 and 8 are opened so that bed B undergoes simultaneous feed and product pressurization from opposite ends.

Step V: Valve 34 is still opened with bed A undergoing further evacuation, while valves 35 and 6 are opened so that bed B is pressurized with feed to the adsorption pressure. Control valve 17 logic determines when product gas from bed B enters the product tank 18.

Step VI: Valve 35 is closed, and bed B undergoes depressurization via valve 2 that connects bed A or a second storage tank, which in turn provides the increasing pressure purge to bed A. During this time, valve 34 is still in the opened position, allowing bed A to undergo equalization rising and evacuation simultaneously.

Based on the cycle described above in relation to FIGS. 1 and 2, several modifications can be made to alter one or more of the steps without deviating from the application or the general functions of these steps. For example, the countercurrent depressurization step IV can be preceded by opening to air until the pressure in the bed drops to 1.0 atm., then evacuation begins.

Figure 8A:
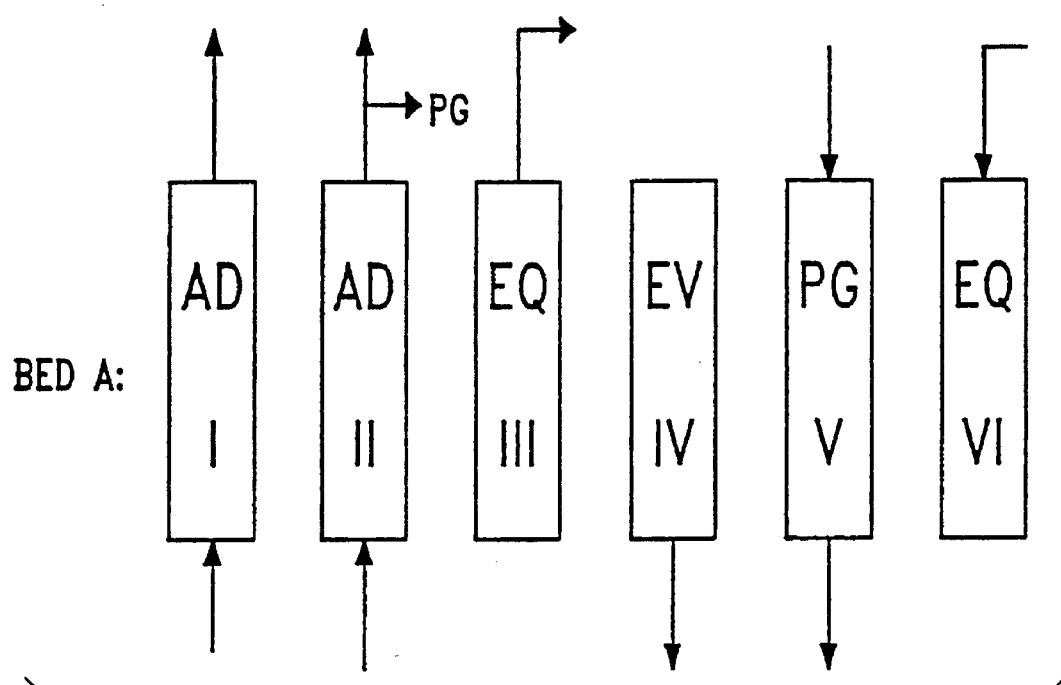
FIG. 8 illustrates the steps of a standard prior art adsorption column cycle, for comparison purposes.
Figure 8B:
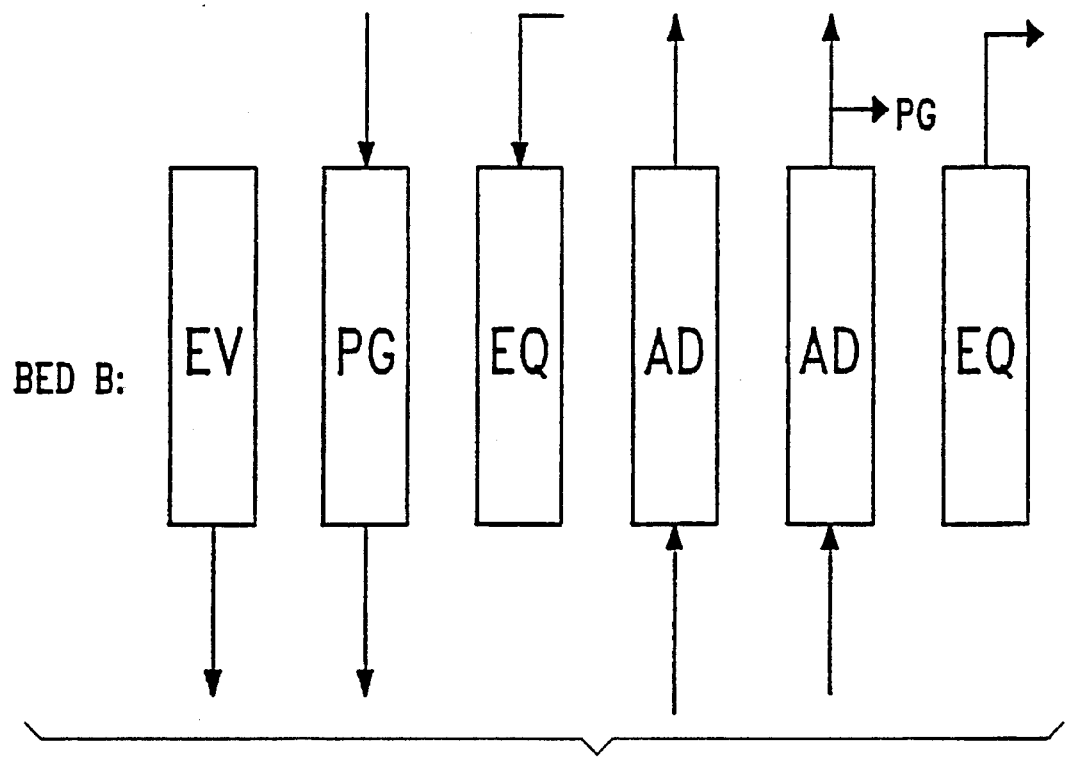

The two-bed process of FIG. 2 utilizing the steps of FIG. 1 can produce comparable oxygen purity and recovery with lower bed size and lower power consumption, as compared to the standard process depicted in FIG. 8. Also, in this process, the vacuum pump is used continuously by one or the other bed during each step of the cycle. Bed size reduction and power reduction achieved are in the range of about 5 to 20%

Figure 4:
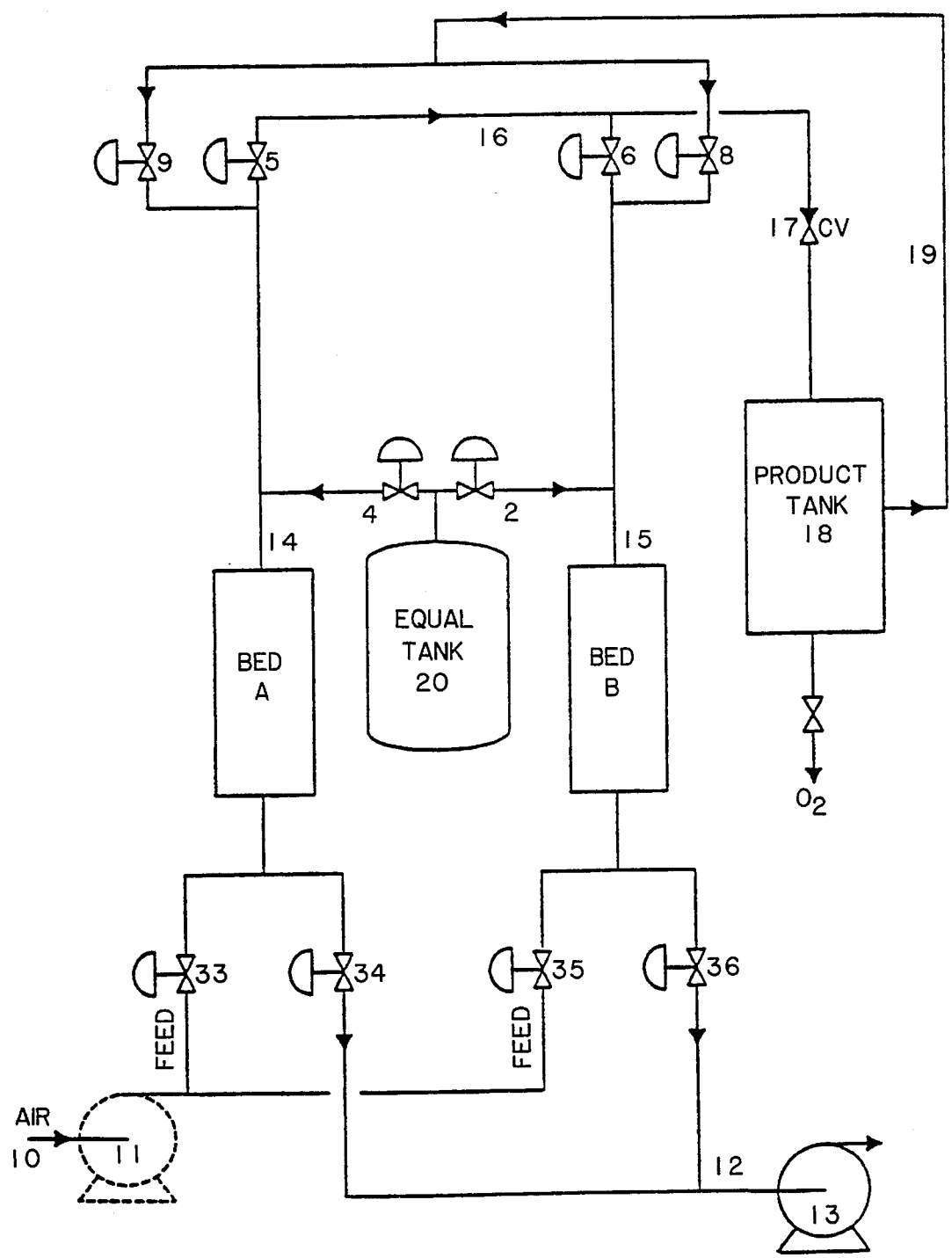
FIG. 4 is a flow sheet for a dual bed cycle having no bed-to-bed communication, according to another embodiment of the invention.
Figure 5A:
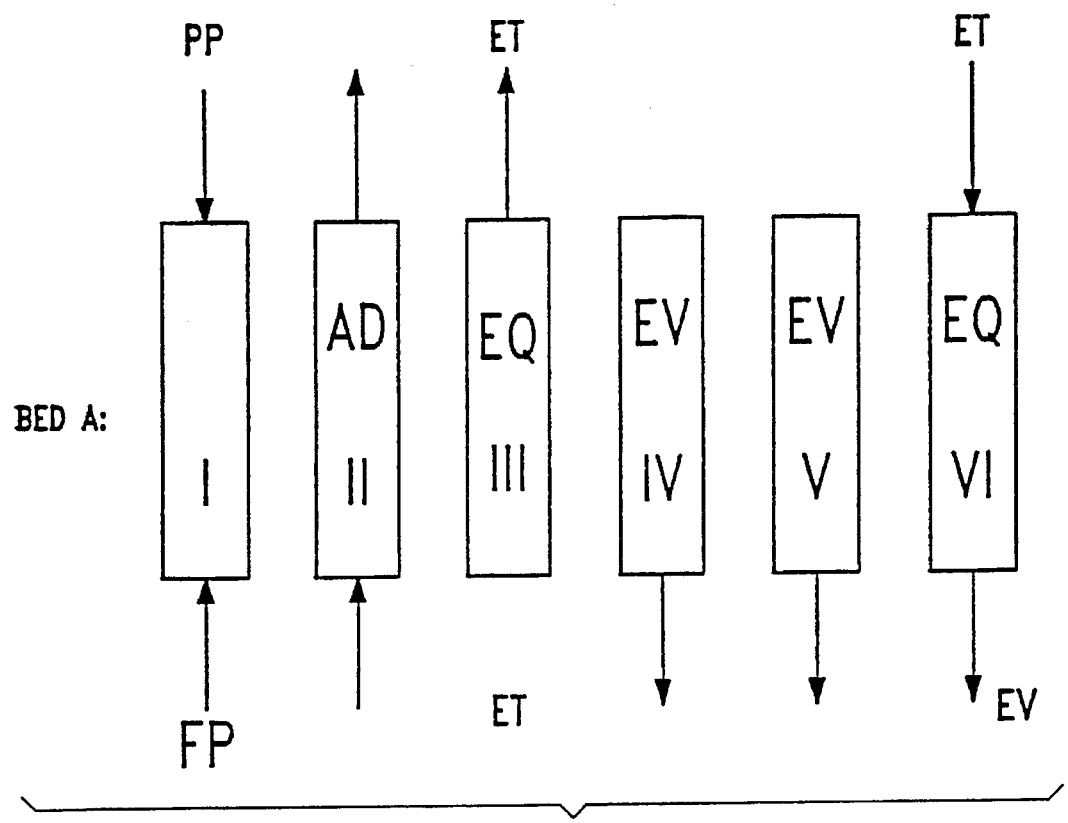
FIG. 5 illustrates the steps in the cycle of the system illustrated by FIG. 4.
Figure 5B:
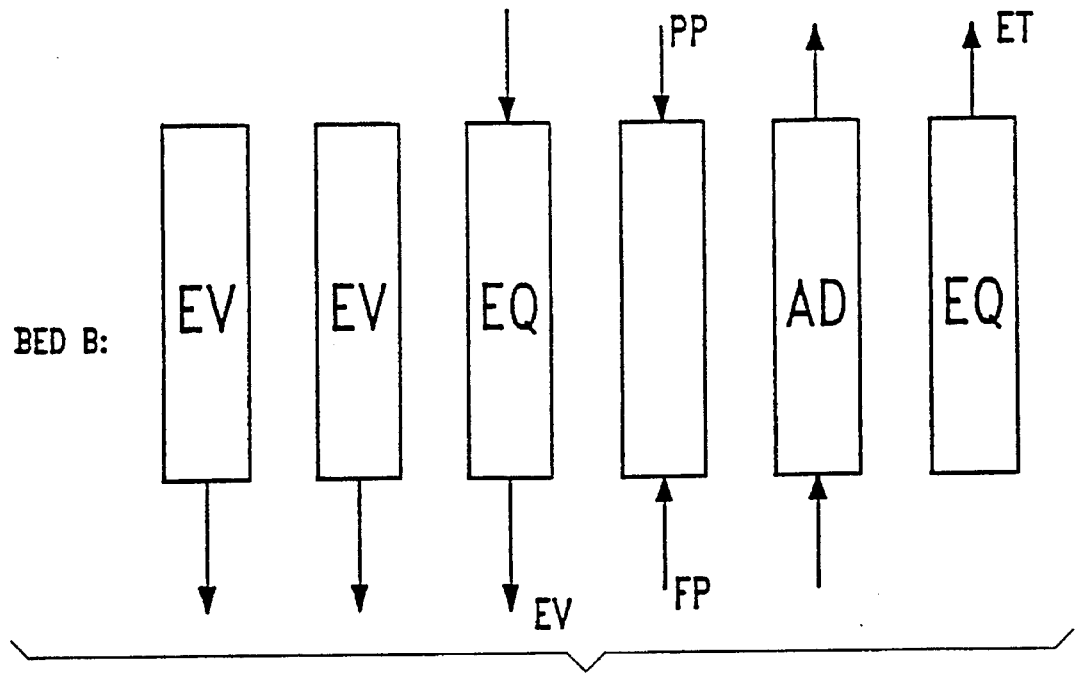

FIGS. 4 and 5 show an alternate system for operating a two-bed PSA process that utilizes a product storage vessel 18 and an equalization tank 20. The execution of the various steps, including the opening and closing of the valves, is similar to the description given above for FIG. 2. However, the use of two storage vessels allows for greater flexibility in the process. For example, the individual steps in the cycle shown in FIG. 5 do not have to occupy fixed periods of time. Thus, physical variables such as pressure and composition can be used easily to determine the time allocated for each step, thereby adjusting the process for changes in temperature, pressure and variable product demand. Since no bed-bed gas transfer is required, then it is possible to run each bed independently, and regard the process as a collection of single bed units. However, for proper sizing and sharing of compressor(s) and vacuumpump(s), some synchronization of the overall cycle of each bed with the cycles of the other beds is necessary.

While the apparatus of the present invention preferably makes use of cylindrical adsorbent beds with shallow dished heads on the top and bottom, and gas flow in the axial direction, other bed configurations can be used. For example, radial beds may be used to achieve a reduction in pressure losses with a concomitant reduction in power consumption. In addition, layered beds can be used with different adsorbents packed at various positions in the bed. For example, activated alumina can be placed at the feed end of the bed to remove water and carbon dioxide from the feed stream, and Li-X zeolite can be placed on top of the activated alumina to perform the separation of air into an oxygen enriched product.

The two bed system and process of FIGS. 4 and 5 provide improvements comparable to those provided by the system and process of FIGS. 1, 2 and 3 but with a slight improvement in the product recovery rate.

Figure 6:
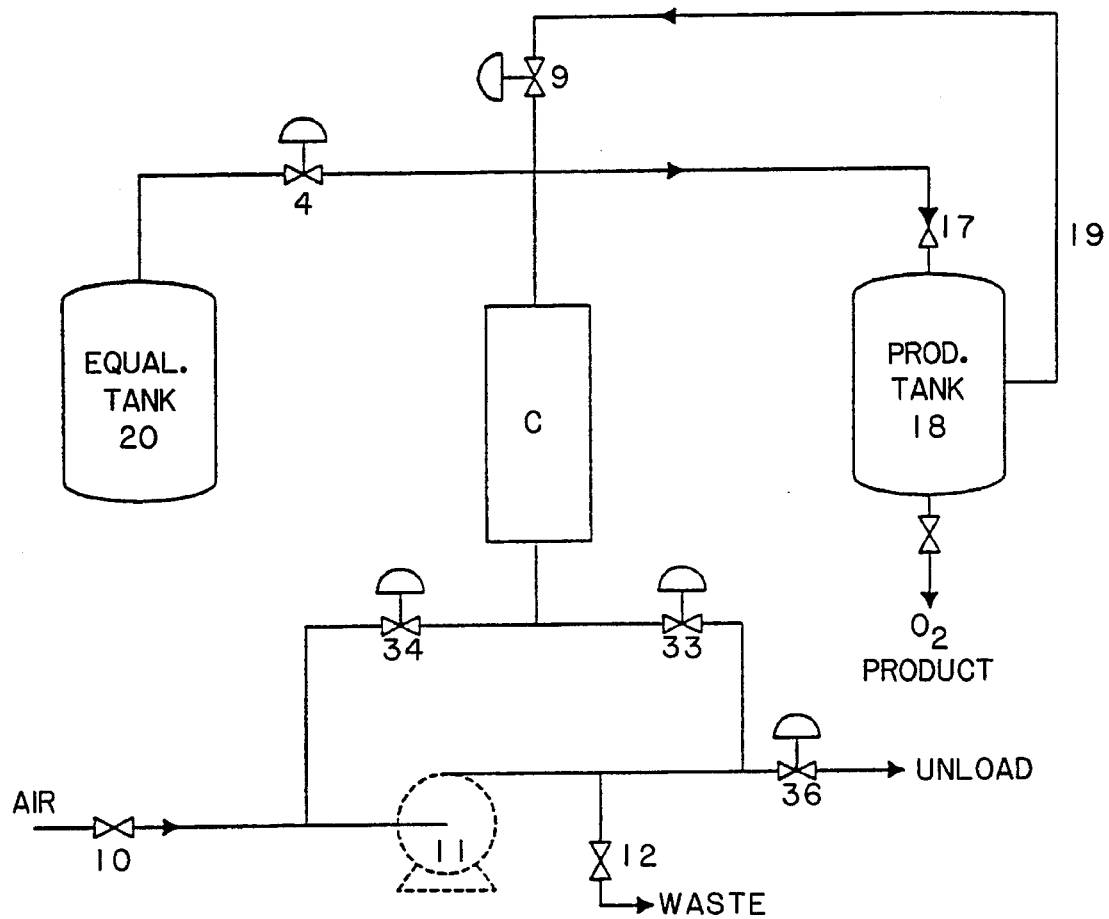
FIGS. 6 and 7 illustrate the flow sheet and column cycle for a single bed process according to another embodiment of the invention.
Figure 7:
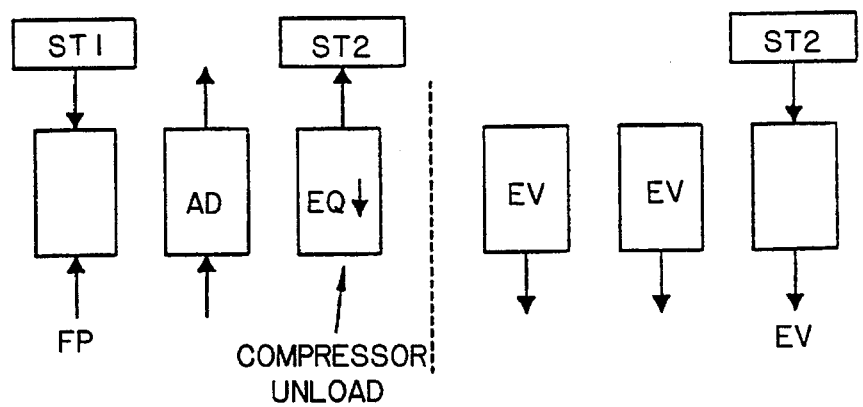

FIGS. 6 and 7 of the drawings illustrate the use of a single bed process utilizing a product tank 18 and an equalization tank 20. In order to have high machine utilization, the process of FIG. 6 shows a single compressor/blower 11 used to perform the pressurization and evacuation steps illustrated in FIG. 7. Referring to FIGS. 6 and 7, the steps in the cycle are briefly described.

Assuming that the cycle begins with simultaneous feed and product pressurization (see FIGS. 6 and 7), valves 9, 10 and 33 are opened and the other valves are closed. Valve 17 is a differential pressure check valve that opens only when the pressure in the adsorbent vessel C becomes greater than the pressure in the product tank 18. After some time, valve 9 closes, and step 2 begins. During step 2, feed pressurization continues via valves 10 and 33, differential check valve 17 opens and product gas enters the product storage tank 18. At the end of step 2, valve 33 is closed, and valve 36 is opened to unload the compressor 11. During this time, the bed undergoes cocurrent depressurization with valve 4 in the opened position to collect the void gas into the equalization tank 20. Note that the check valve 17 will be in the closed position during the cocurrent depressurization step (step III), since the pressure of the adsorbent bed C will fall below that of the product tank (18). During step III execution, valves 9, 10 and 33 are in the closed positions. Upon the termination of step III, valves 12 and 34 are in the opened positions, while valves 4, 9, 10, 17, 33 and 36 are closed. During this step (step IV), gas in the adsorbent vessel C leaves via valve 34 and enters through the inlet of the compressor.

The next step (step V), illustrated in FIG. 7, is just a continuation of step IV (evacuation step). The final step (step VI) is executed with valves 12 and 34 still in the open positions. During this step, valve 4 is opened, and the gas from the equalization tank 20 provides the reflux gas to desorb the adsorbed gas and to partially pressurize the bed C.

Although only one example of a single bed process is described, other modifications of the single bed process can be easily obtained without deviating from the basic features of the invention.

FIG. 8 illustrates a conventional PSA process using a prior art cycle with cycle time about 10 to 20% greater than that of the present invention. In this figure, the symbols have the following meaning: AD= Adsorption and gross product production, PG=purge, EQ =Equalization, and EV=Evacuation.

It should be noted that the conventional cycle of the prior art consumes more power than the cycle of this invention. The present process (FIG. 1) provides a significant reduction in power consumption (more than 15%) over the prior art cycle (FIG. 8) using the same adsorbent. An advantage of the cycle of this invention (FIG. 1) over the standard equalization cycle (FIG. 8) is that it permits 100% utilization of the vacuum pump.

Although the novel cycle has been described in relation to VPSA $O_2$ processes, wherein particular embodiments of the invention have been shown, other embodiments are contemplated along with modification of the disclosed features, as being within the scope of the claims. For example, the novel cycle is not restricted to transatmospheric vacuum pressure swing adsorption (VPSA) cycles, and super atmospheric or subatmospheric pressure swing adsorption cycles may also be used Thus the terms "pressurized", "high pressure", "medium pressure", "depressurization", etc., are used herein and in the claims as relative terms to include negative as well as positive pressures. Thus, gas under a small vacuum pressure is "pressurized" or at a "high pressure" relative to gas under a higher vacuum or negative pressure. Also, the novel cycle can be used in other mixture separations, e.g., $N_2/CH_4$ separation from landfill gas, and other gas mixtures for example feeds containing hydrogen as the nonpreferentially adsorbed product component and various impurities as selectively adsorbable components. These include light hydrocarbons, CO, $CO_2$, $NH_3$, $H_2S$, argon and water. Hydrogen-rich feed gas containing at least one of these adsorbable components include: catalytic reformer off-gas, methanol synthesis loop purge, dissociated ammonia and demethanizer over-head gas, steam-reformed hydrocarbons, ammonia synthesis loop purge gas, electrolytic hydrogen and mercury cell hydrogen. The invention is also useful for separating any or all of the aforementioned adsorbables from gas mixtures in which nitrogen or helium is the primary constituent.

In summary, it will be apparent to those skilled in the art that the present invention provides a novel vacuum pressure swing adsorption process for producing a concentrated gas from gas mixtures, involving the novel steps of simultaneous equalization and evacuation of the adsorption bed in one step, followed by simultaneous product and feed repressurization of the adsorption bed in another step, resulting in an overall faster and more efficient process in which the vacuum blower is utilized full time and power consumption is reduced by about 15%. The novel process of the present invention can be conducted at pressure levels which are superatmospheric, transatmospheric or subatmospheric, and applies to the separation of gases in general, using PSA process systems.

It should be understood that the foregoing description is only illustrative of the invention. Various alternatives, modifications, and other process conditions (e.g., operating pressure ranges) can be devised by those skilled in the art without departing from the invention. Accordingly, the present invention is intended to embrace all such alternatives, modifications and variances which fall within the scope of the appended claims.

What is claimed is:

1. In a pressure swing adsorption process for the separation of at least one non-preferentially-adsorbable first gas from a gas mixture containing said first gas and one or more selectively-adsorbable second gas(es), in which said gas mixture is supplied to at least one adsorption bed unit having an upstream end and a downstream end, and being capable of selectively adsorbing said second gas(es) at elevated pressure while passing said first gas therethrough to a receptor tank, comprising the steps of simultaneously supplying said gas mixture, under pressure, to the upstream end of said adsorption bed unit and said first gas, under pressure, to the downstream end of said adsorption bed unit to hasten the pressurization of said bed unit; discontinuing the supply of said first gas while continuing the supply of said gas mixture at said elevated pressure to develop a high adsorption pressure within said adsorption bed unit; discharging the non-adsorbed first gas from said adsorption bed unit into said receptor tank to equalize the pressure therein; discontinuing the supply of said gas mixture to said adsorption bed unit and discharging void gas from said adsorption bed unit into a pressure equalization unit for resupply to the downstream end of the adsorption bed unit for the simultaneous depressurization of said pressure-equalization unit to a low pressure and countercurrent purging and cleaning of the adsorption bed unit and the partial repressurization of said adsorption bed unit to provide a faster, more efficient operation.

2. The process according to claim 1 which comprises using as the pressure equalization unit a second adsorbent bed unit.

3. The process according to claim 1 comprising pressurizing said bed unit to a high adsorption pressure between about 1.2 atm. and 2.0 atm.

4. The process according to claim 3 comprising pressurizing said bed unit to a high adsorption pressure of about 1.4 atm.

5. The process according to claim 1 comprising depressurizing said pressure equalization unit to a low pressure within the range of about 0.30 atm. to about 0.45 atm.

6. In a pressure swing adsorption process for producing oxygen gas from air comprising supplying pressurized air to at least one adsorption bed unit having an upstream end and a downstream end, and being capable of selectively adsorbing gaseous components including nitrogen while passing oxygen therethrough to an oxygen receptor tank, comprising the steps of simultaneously supplying compressed air to the upstream end of said adsorption bed unit and pressurized oxygen to the downstream end of said adsorption bed unit to generate a medium pressure therein in a short period of time; discontinuing said supplying of pressurized oxygen gas to the downstream end of said adsorption bed unit while continuing the supply of compressed air to develop a high adsorption pressure within said adsorption bed unit; discharging oxygen gas from said adsorption bed unit into said oxygen receptor tank to increase the pressure in said oxygen receptor tank; discontinuing the supply of compressed air to said adsorption bed unit and collecting void gas from said adsorption bed unit into a pressure equalization unit for resupply to the downstream end of the adsorption bed unit, and releasing said void gas from said pressure equalization unit in a countercurrent direction to the downstream end of said adsorption bed unit to simultaneously depressurize said pressure-equalization unit and purge said adsorption bed unit, and passing oxygen gas from said oxygen receptor tank to the adsorption bed unit, for the simultaneous depressurization of said oxygen receptor tank to a low pressure and partially pressurize said adsorption bed unit to provide a faster, more efficient operation.

7. The process according to claim 6 which comprises using as said pressure equalization unit a second adsorption bed unit.

8. A pressure swing adsorption apparatus for the separation of at least one non-preferentially-adsorbable first gas from a gas mixture containing said first gas and one or more selectively-adsorbable second gas(es), comprising at least one adsorption bed unit having an upstream and a downstream end, and containing composition capable of selectively adsorbing said second gas(es) from said gas mixture at an elevated pressure, a receptor unit communicating with the downstream end of said bed unit through a first control valve, to receive a pressurized supply of said first gas from the adsorption bed unit, a pressure-equalization unit for discharging void gas through a second control valve into the downstream end of said adsorption bed unit to reduce the pressure therein and cause the desorption and depressurization of said second gas(es) therefrom, and compressor means for supplying the gas mixture at said elevated pressure through a third control valve to the upstream end of the adsorption bed unit, means for controlling said first control valve and said third control valve to permit the supply of the gas mixture to the upstream end of said adsorption bed unit at said elevated pressure and the simultaneous supply of the pressurized first gas from said receptor unit to the downstream end of said adsorbent bed unit to hasten the pressurization of said adsorbent bed unit to high pressure; means for causing the first gas to flow from said adsorption bed unit to said receptor unit when the pressure in the adsorption bed exceeds the pressure in the receptor unit, to collect the first gas, means for causing the depressurization and release of residual void gas present in said adsorption bed unit through said second control valve into said pressure-equalization unit, pressure reducing means communicating with the upstream end of the adsorption bed unit for depressurizing the adsorption bed unit to a low pressure, and means for releasing void gas from said pressure-equalization unit in the countercurrent direction to the downstream end of said adsorption bed unit to simultaneously depressurize said pressure-equalization unit and purge said adsorption bed unit of the adsorbed second gas(es), thereby hastening the pressurization of said adsorption bed unit to a medium pressure prior to the resupply of pressurized gas mixture thereto to provide a faster and more efficient operation.

9. An apparatus according to claim 8 comprising a plurality of connected adsorption bed units, one of which functions as the pressure equalization unit for another, to permit simultaneous depressurization of one of said connected adsorption bed units and equalization and depressurization of another of said connected adsorption bed units prior to simultaneous gas mixture feed and first gas repressurization of said another of said connected adsorption bed units.

10. An apparatus according to claim 8 comprising a plurality of adsorption bed units, each of which is connected to a pressure-equalization tank comprising said pressure-equalization unit, and a said control valve between each said adsorption bed unit and said pressure-equalization tank, whereby direct bed unit-to-bed unit gas transfer is avoided.

11. An apparatus according to claim 8 comprising a plurality of said adsorption bed units, at least one of which is capable of being evacuated at any given time, a continuously-operating pressure reducing vacuum pump connected to the upstream end of each of said adsorption bed units, and control valve means for controlling the flow of the adsorbed second gas(es) from the adsorption bed unit which is being evacuated.

12. An apparatus according to claim 8 in which said compressor means is capable of pressurizing said adsorption bed unit to a high pressure within the range of about 1.2 atm. to about 2.0 atm.

13. An apparatus according to claim 12 in which said compressor means is capable of pressurizing said adsorption bed unit to a high pressure of about 1.4 atm.

14. An apparatus according to claim 8 in which said pressure reducing means is capable of depressurizing said adsorption bed unit to a low pressure within the range of about 0.30 atm. to about 0.45 atm.

15. A pressure swing adsorption apparatus for the production of oxygen-rich gas from feed air containing oxygen and other gaseous components comprising at least one adsorption bed unit having an upstream end and a downstream end, and containing composition capable of selectively adsorbing said other gaseous components of feed air at an elevated pressure, without selectively adsorbing said oxygen, a receptor unit communicating with the downstream end of said bed unit through a first control valve, to receive a pressurized supply of oxygen from the adsorption bed unit, a pressure-equalization unit for discharging void gas through a second control valve into the downstream end of said adsorption bed unit to reduce the pressure therein and cause the desorption and evacuation of the selectively adsorbed gaseous components of said feed air, except for oxygen, therefrom, and compressor means for supplying a pressurized supply of said feed air through a third control valve to the upstream end of the adsorption bed unit, means for controlling said first and third control valve to permit the supply of said pressurized supply of said feed air to the upstream end of said adsorption bed unit and the simultaneous supply of a countercurrent of the pressurized oxygen from said receptor unit to the downstream end of said adsorption bed unit to hasten the pressurization of said adsorption bed unit to a high pressure; means for causing the oxygen gas to flow from said adsorption bed unit to said receptor unit when the pressure in the adsorption bed unit exceeds the pressure in the receptor unit, means for causing the depressurization and release of residual void gas present in said adsorption bed unit through a fourth control valve into said pressure-equalization unit after the supply of the pressurized air is discontinued to said adsorption bed unit, pressure reducing means communicating with the upstream end of the adsorption bed unit for depressurizing the adsorption bed unit to a low pressure, and means for releasing said void gas from said pressure-equalization unit in the countercurrent direction to the downstream end of said adsorption bed unit to simultaneously depressurize said pressure-equalization unit and purge said adsorption bed unit of the selectively-adsorbed gaseous components, thereby hastening the pressurization of said adsorption bed unit to a medium pressure prior to the resupply of pressurized air thereto, to provide a faster and more efficient operation.

16. An apparatus according to claim 15 comprising a plurality of adsorption bed units, each of which is connected to a pressure equalization tank comprising said pressure-equalization unit, and a said control valve between each said adsorption bed unit and said pressure-equalization tank, whereby direct bed unit-to-bed unit gas transfer is avoided.

17. An apparatus according to claim 15 comprising a plurality of said adsorption bed units, at least one of which is capable of being evacuated at any given time, a continuously-operating pressure reducing vacuum pump connected to the upstream end of each of said adsorption bed units, and control valve means for controlling the flow of the selectively adsorbed gaseous components of air, except for oxygen, from the adsorption bed unit which is being evacuated.

18. An apparatus according to claim 15 in which said compressor means is capable of pressurizing said adsorption bed unit to a high pressure within the range of about 1.2 atm. to about 2.0 atm.

19. An apparatus according to claim 18 in which said compressor means is capable of pressurizing said adsorption bed unit to a high pressure of about 1.4 atm.

20. An apparatus according to claim 15 in which said pressure reducing means is capable of depressurizing said adsorption bed unit to a low pressure within the range of about 0.30 atm. to about 0.45 atm.

\* \* \* \* \*